US011006430B2

(12) United States Patent
Monajemi et al.

(10) Patent No.: US 11,006,430 B2
(45) Date of Patent: May 11, 2021

(54) EVENT-DRIVEN RADIO RESOURCE MANAGEMENT TRIGGERING

(71) Applicant: Cisco Technology, Inc., San Jose, CA (US)

(72) Inventors: Pooya Monajemi, Irvine, CA (US); Vishal S. Desai, San Jose, CA (US); Santosh Babaji Kulkarni, Sunnyvale, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 16/375,739

(22) Filed: Apr. 4, 2019

(65) Prior Publication Data

US 2020/0322960 A1 Oct. 8, 2020

(51) Int. Cl.
| | | |
|---|---|---|
| *H04W 72/08* | (2009.01) | |
| *H04W 16/14* | (2009.01) | |
| *H04B 17/318* | (2015.01) | |
| *H04B 17/336* | (2015.01) | |
| *H04W 24/10* | (2009.01) | |

(52) U.S. Cl.
CPC ........ *H04W 72/082* (2013.01); *H04B 17/318* (2015.01); *H04B 17/336* (2015.01); *H04W 16/14* (2013.01); *H04W 24/10* (2013.01)

(58) Field of Classification Search
CPC ... H04W 72/082; H04W 16/14; H04W 24/10; H04B 17/318; H04B 17/336
See application file for complete search history.

(56) References Cited

U.S. PATENT DOCUMENTS

| | | | |
|---|---|---|---|
| 2004/0185786 A1* | 9/2004 | Mirbaha | H04B 17/309 455/67.11 |
| 2009/0149135 A1* | 6/2009 | Mangold | H04W 16/14 455/77 |
| 2011/0235612 A1* | 9/2011 | Abeta | H04W 72/1215 370/329 |
| 2013/0183994 A1* | 7/2013 | Ringstrom | H04W 72/1231 455/452.1 |
| 2015/0195192 A1 | 7/2015 | Vasseur et al. | |
| 2016/0261468 A1 | 9/2016 | Premkumar et al. | |
| 2018/0278486 A1 | 9/2018 | Mermoud et al. | |

OTHER PUBLICATIONS

Dan Pan, "Analysis of Wi-Fi performance data for a Wi-Fi throughout prediction approach," Degree Project in Electrical Engineering, Second Cycle, 30 Credits, Stockholm, Sweden 2017, 50 pages.

* cited by examiner

*Primary Examiner* — Saumit Shah
(74) *Attorney, Agent, or Firm* — Patterson + Sheridan, LLP (57) ABSTRACT

Techniques for a machine learning event-driven radio resource management (ED-RRM) module which provides analysis of interference events in a network system are described. The network system reacts to the detection of interference in a network system and uses multiple input parameters to determine a type of device creating the interference, a predicted duration of the interference, and an ED-RRM decision on whether to activate the radio resource management (RRM) processes to alter the network transmission or block the RRM processes to conserve system resources for the network system.

20 Claims, 6 Drawing Sheets

EVENT-DRIVEN RADIO RESOURCE MANAGEMENT TRIGGERING

TECHNICAL FIELD

Embodiments presented in this disclosure generally relate to controlling network Access Points (APs) in communication networks. More specifically, though not exclusively, embodiments disclosed herein relate to intelligently determining, through machine learning, when event-driven radio resource management should be implemented to avoid channel and radio interference.

BACKGROUND

As the number of networked devices transmitting signals on various frequencies continually increases, the likelihood of radio interference between the various devices also increases. Furthermore, many electronic devices that are not connected to networks can cause enough radio interference that the network connection between networked devices is disrupted. Many modern networked communication devices detect the radio interference and begin processes to decrease the effects of the interference, such as changing the channel/radio frequencies used by the connected networked device.

In many cases, the processes used to change the channel/radio frequencies are expensive for the device to perform in both computing resources needed to implement the processes and power to complete the processes in addition to being disruptive to ongoing communications in various subsystems in the network. In some cases, these processes are triggered automatically as soon as adverse interference conditions are detected which can lead to wasted resources and energy in the system as well as unnecessary communication disruption, especially in instances when the radio interference is passing or temporary.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for event-driven radio resource management (ED-RRM) at a central controller in a network. The method includes detecting a channel interference caused by interfering signals from an electronic device; determining from the interfering signals a device type for the electronic device; predicting, using a machine learning process, a duration of the channel interference; and determining, using the machine learning process and from the device type and the predicted duration of the channel interference, an ED-RRM decision to implement an RRM process; and implementing the ED-RRM decision by initiating the RRM process or suppressing the RRM process according to the ED-RRM decision. Other embodiments of this aspect include corresponding computer systems, apparatus, and computer programs recorded on one or more computer storage devices, each configured to perform the actions of the methods.

In another embodiment, a system for event-driven radio resource management (ED-RRM) at a central controller in a network is described. The system includes a processor and a memory comprising instructions which, when executed on the processor, performs an operation. The operation includes: detecting an channel interference caused by interfering signals from an electronic device; determining from the interfering signals a device type for the electronic device; predicting, using a machine learning process, a duration of the channel interference; and determining, using the machine learning process and from the device type and the predicted duration of the channel interference, an ED-RRM decision to implement an RRM process; and implementing the ED-RRM decision by initiating the RRM process or suppressing the RRM process according to the ED-RRM decision.

In another embodiment, a computer program product for event-driven radio resource management (ED-RRM) at a central controller in a network is described. The computer program product includes a non-transitory computer-readable medium program having program instructions embodied therewith, the program instructions executable by a processor to perform an operation. The operation includes: detecting an channel interference caused by interfering signals from an electronic device; determining from the interfering signals a device type for the electronic device; predicting, using a machine learning process, a duration of the channel interference; and determining, using the machine learning process and from the device type and the predicted duration of the channel interference, an ED-RRM decision to implement an RRM process; and implementing the ED-RRM decision by initiating the RRM process or suppressing the RRM process according to the ED-RRM decision.

Example Embodiments

Interference and noise in networks, such as Wi-Fi wireless local area networks (WLANs) can cause performance issues for devices in the network. As described above, many modern networked devices, including network controllers and access points (APs) for a network, detect the radio interference and begin processes to decrease the effects of the interference, such as changing the channel/radio frequencies used by the connected networked device including the APs for the network.

For example, event-driven-radio resource management (ED-RRM) in a network and/or AP controller provides processes to react to certain observed conditions in the network deployment such as a very high level of noise or interference. These observed conditions are often detrimental to the system performance and it may be advantageous to switch channels at the AP instead other remedies such as increasing the power of the signals broadcast by the AP. In some examples, the reaction to detected interference includes quickly switching the operating channel of connected APs. However, channel switches are costly and resource intensive operations for the APs to perform. Thus, in some examples, it is not always beneficial for a network system to immediately react to every adverse condition in the system.

For example, in a wireless network there are instances when a person carrying a device causing interference (electronic device) occasionally walks across the coverage area (such as a building) covered by the network system. While the interference from the electronic device at the time of this person's presence in the network system causes a temporary adverse impact, it is not always optimal to react immediately since the source of the interference is expected to soon leave the coverage area of the network system. In contrast, in an example where a more permanent interference source, such as a cordless phone and station, is causing interference in the coverage area of the network system, the interference is likely be present for a longer duration and require a change in the network system.

As the number and differing types of networked devices transmitting signals on various radio frequencies increases, the instances of radio interference between the various devices also increases. Additionally, many electronic devices that are not connected to wireless networks but can cause interference in the network frequencies spectrum (e.g., 2.4 and 5 gigahertz (Ghz)) are proliferating. These include consumer devices such as video cameras, headphones, and some internet of things devices, etc. In some examples, these additional electronic devices cause enough radio interference in the frequencies used by network connections to disrupt the network connections. Additionally, each network system and its corresponding coverage area are unique and experience unique interference events. Due to this uniqueness, creating generalized deterministic rules applicable to all network system deployments is difficult if not impossible.

As described herein, a machine learning (ML) based ED-RRM module provides analysis of the interference instances/events in order to preserve and optimize the network system resources. In general, the system uses multiple input parameters to determine a type of device creating the interference, a predicted duration of the interference, and an ED-RRM decision on whether to activate the radio resource management (RRM) processes to alter the network transmission (e.g., change a channel at an AP) or block the RRM processes to conserve network system resources.

Figure 1:
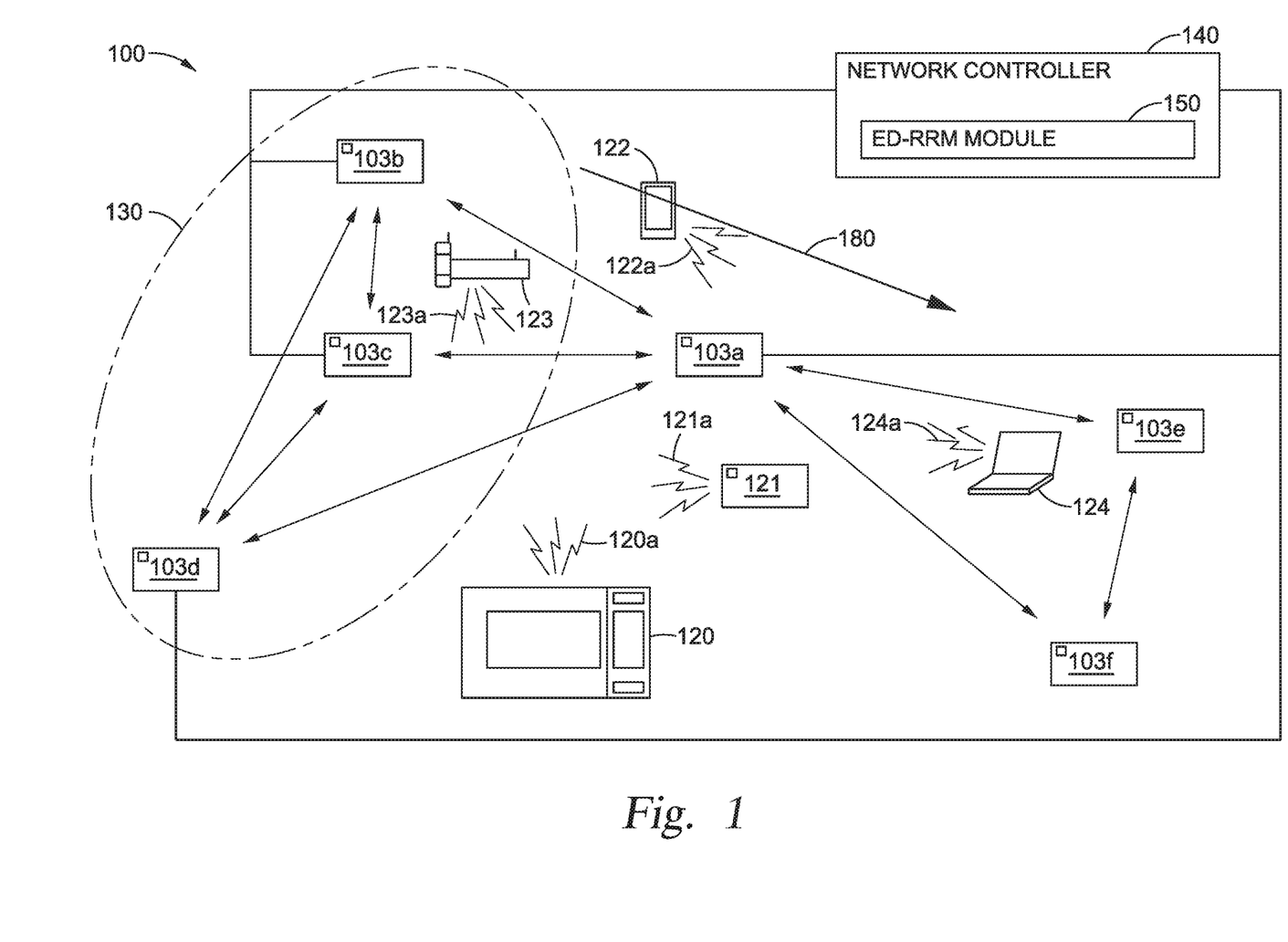
FIG. 1 illustrates a network system, according to one embodiment.

FIG. 1 illustrates a wireless network system, according to one embodiment. As shown, the wireless network system 100 includes APs 103a-103f. In general, the APs 103a-103f are in communication with each other and are also in communication with the network controller 140 to provide a wireless local area network (WLAN). The network controller 140 includes the ED-RRM decision module 150 as described herein. As the APs 103a-f provide wireless network connections to the area covered by the network system 100, various sources of interference may be present and detected in the system. For example, the interference may be caused by electronic communication devices such as a laptop 124, a Wi-Fi AP 121 (which is not part of the network 100), and/or a mobile telecommunication device, device 122. In some examples, the associated interfering signals 124a, 121a, and 122a may include additional information that can be detected by one or more radios in the APs 103a-f such as data identifying a source type for the electronic device, a source media access control (MAC) address, and/or a signal bandwidth for the interfering signals. This information and other information is used by the ED-RRM module 150 to intelligently predict the device types, a predicted duration of the interference, and/or an ED-RRM decision to initiate and/or suppress an RRM process.

Additional sources of interfering signals include devices that broadcast radiation/radio signals into the network system. For example, a microwave 120 and cordless phone 123 both emit signals that interfere with the network system 100. Other electronic devices may include other types of devices that emit radio signals such as video cameras, headphones, etc.

In some examples, the various electronic devices include devices that are in transit and/or only cause temporary interference such as device 122 and microwave 120. In other examples, the electronic devices include devices that provide long term interference such as the Wi-Fi AP 121 and the laptop 124.

In some examples, the APs 103a-103f detect the interfering signals and measure a strength of the interfering signals. The ED-RRM module 150 determines from the various signals which AP is experiencing the most amount of interference and assigns the identified AP as the primary interference AP. For example, APs 103a-c all experience interference from the cordless phone 123, but the interference detected by the AP 103c may be greater than the interference experienced by the APs 103a and 103b. In this example, the ED-RRM module 150 identifies the AP 103c as the primary AP for the interference and implements the ED-RRM decision based on the primary AP.

In another example, the APs 103a-f provides interference histories of the various interfering signals experienced at each of the APs. For example, the AP 103b experiences and tracks a temporary rising interference time and a subsequent lowering interference time from the device 122. The AP 103a also experiences and tracks a temporary rising interference time and lowering interference. The ED-RRM module 150 uses these tracked interference levels to determine that the device 122 is passing through the network system 100 in the direction 180.

In some examples, a number of the APs in the network system are collocated in a similar area and experience similar traffic and interfering signals. These APs are then grouped together to implement ED-RRM decisions as a group. For example, the APs 103b, 103c and 103d are grouped into the AP group 130 and a determined ED-RRM is applied to the group, as further described herein. In some examples, the APs 103b, 103c and 103d are grouped together based on similar interfering signal experiences such as similar a same type of interference during a similar time. Additional processes performed by the ED-RRM module 150 are described in further detail in relation to FIGS. 2-7.

Figure 2:
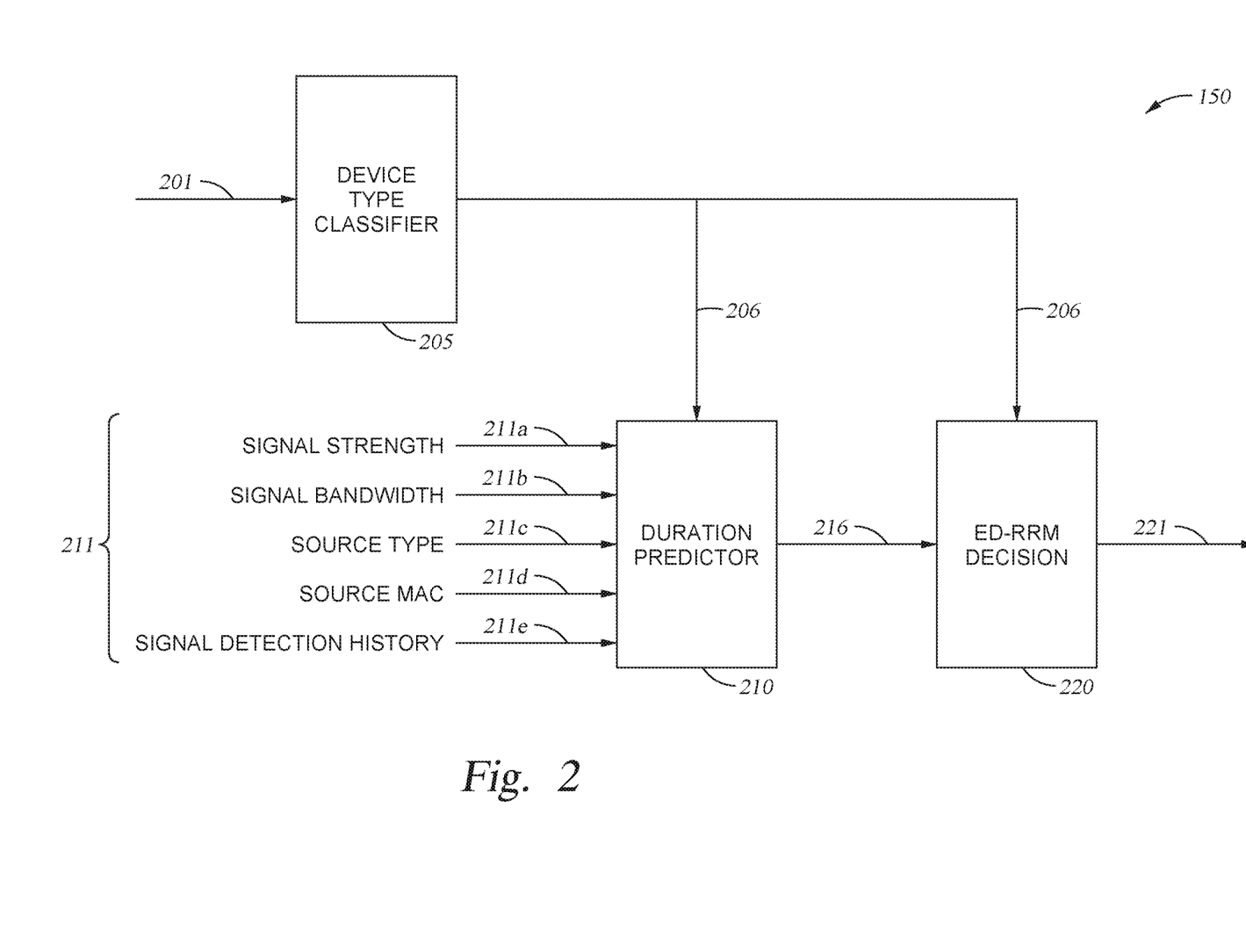
FIG. 2 illustrates an event driven resource radio management (ED-RRM) module, according to one embodiment.

FIG. 2 illustrates an ED-RRM module, according to one embodiment. For example, the ED-RRM module 150, executing on the network controller, is shown and includes a device type classifier module 205, a duration predictor module 210, and an ED-RRM decision module 220. In one embodiment, each of the modules 205, 210 and 220 functions as machine learning functions, such as neural networks. For example, the modules 205, 210, and 220 use the various inputs into the ED-RRM module 150 to train a neural network and use the predicted outputs of the neural network to ultimately produce the ED-RRM decision 221 as described in relation to FIGS. 4-7 herein.

In one embodiment, the device type classifier module 205 receives an interfering signal 201 and uses the various properties of the interfering signal 201 to determine what type of device is causing the interference. In some examples, the device type classifier utilizes signal fingerprinting which parses the data/metadata transmitted in the interfering signal and/or identifies other identifying aspects of the interfering signal that are typically include in a data transmission signal. For example, the Wi-Fi AP 121, the laptop 124, and the device 122 all transmit data signals that include identifying information that may be interpreted by the device type classifier module 205 to determine the device type.

In another example, the interfering signal 201 does not include identifying information in the signal. For example, the interfering signal 120a from the microwave 120 is only in the form of radiation from the microwave and does not contain data that can be used to identify the device within the signal. In that case, the device type classifier module 205 uses the neural network to determine the device type and in some examples learns/uses a general classification for the interference device. For example, the device type classifier module learns that the interfering signal 120a typically includes a set of interference properties including interference strength and typical duration, etc. Once the device type output 206 is predicted by the device type classifier module 205, the device type output 206 is provided to the duration predictor module 210 and the ED-RRM decision module 220.

The duration predictor module uses the predicted device type output 206 along with signal parameters 211 to predict a duration for the interference. The signal parameters include signal strength 211a. In some examples, the signal strength 211a is the strength of the interfering signal 201 at a primary or main sensed AP. For example, the AP 103a may experience a stronger level of interference from interfering signal 120a from the microwave 120 than any of the other APs in the network system 100 such that the ED-RRM decision is determined based on the interference experienced at the AP 103a, since this AP is the main candidate for an RRM change. In some examples, the signal strength 211a is a received signal strength indicator (RSSI) determined by the AP 103a and received at the network controller 140 for use by the ED-RRM module 150.

While the signal strength at the primary AP is important for implementing the ED-RRM decision, the signal's strength and other information at any neighboring APs in the network system 100 may be used to predict a duration of the interference. For example, the signal detection history 211e includes the signal strength experienced at non-primary APs experiencing the interfering signals. For example, the interfering signal 122a causes interference at both the AP 103a and the AP 103b, where AP 103a experiences a higher level of interference than the AP 103b. The duration predictor module 210, uses the signal detection history from the AP 103b (including both the current level of interference and past levels of interference experienced by the AP 103b) in addition to the history of interference at the AP 103a to determine that the source of the interfering signal 122a (i.e., device 122) is transitory and that the interfering signal 122a is likely to pass soon.

This information used along with the primary AP RSSI carries information about the location of the source, as well as the loudness/strength of interfering signal at the source. In one example, these two pieces of information can be derived by the AP and/or network controller using closed-form formulas and directly provided to the duration predictor module 210 (as opposed to raw information). Additionally, signal detection history at the primary AP and neighboring APs represents detected motion of the interference source and various past interference events in the network system. Additional input parameters are discussed in relation to FIGS. 4-7.

Figure 3:
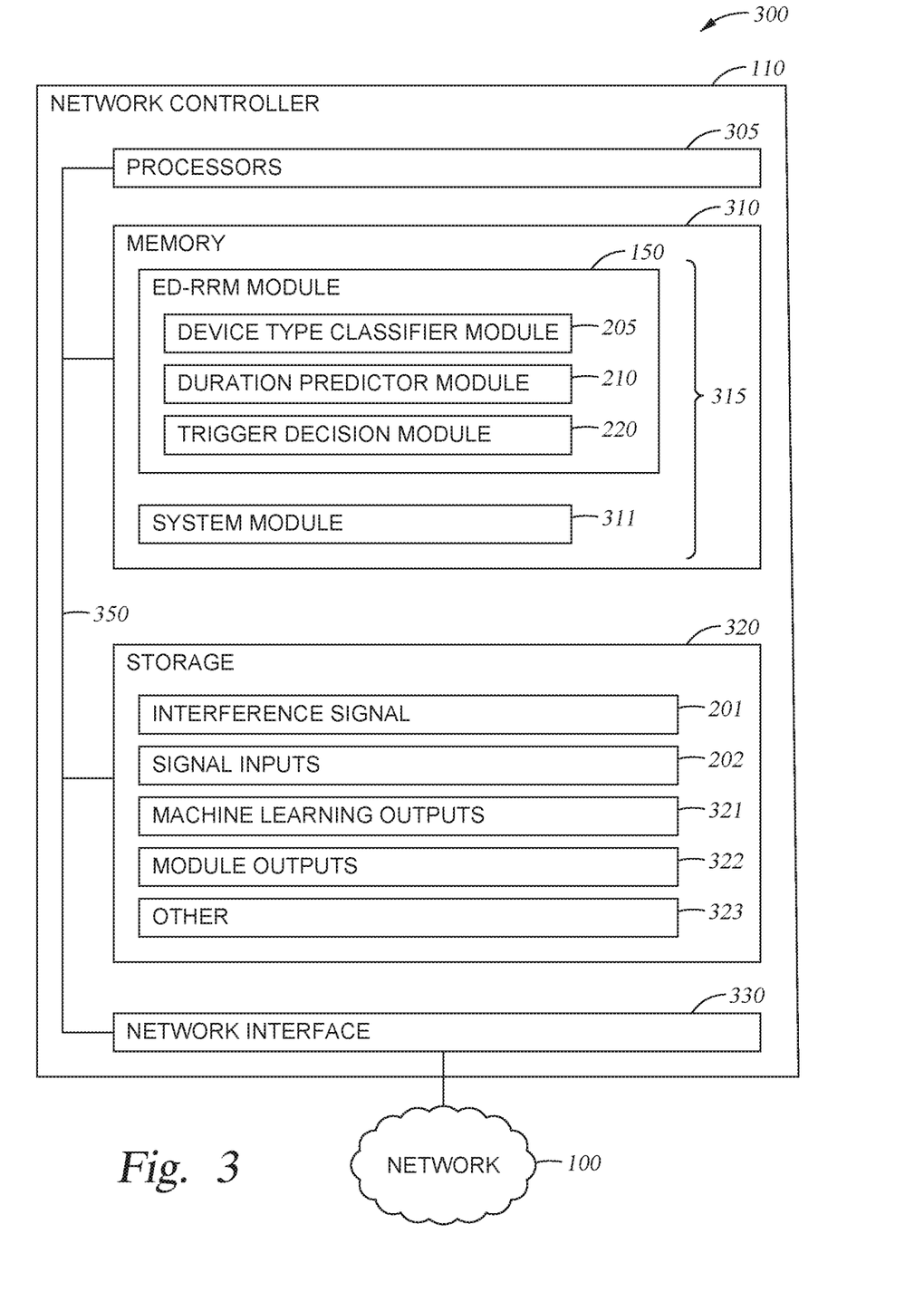
FIG. 3 illustrates is a block diagram of a network controller to provide for ED-RRM, according to one embodiment.

FIG. 3 illustrates is a block diagram of a network controller to provide for ED-RRM decisions, according to one embodiment. As shown in FIG. 3, the arrangement 300 includes the network controller 110, which perform the methods described herein at least in relation to FIGS. 4-7. The network controller 110 is shown in the form of a general-purpose computing device. In some examples, the network controller is a designated networking device in the network system 100. For example, the network controller may be a designated network controller device, a switch, and/or an AP designated as the network controller. The components of network controller 110 may include, but are not limited to, one or more processing units or processors 305, a system memory 310, a storage system 320, network interface 330, and a bus 350 that couples various system components including the system memory 310 and storage system 320 to processors 305 along with the network interface 330. In other embodiments, the arrangement 300 is distributed and includes a plurality of discrete computing devices that are connected through wired or wireless networking.

The bus 350 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The network controller 110 typically includes a variety of computer system readable media. Such media may be any available media that is accessible by the network controller 110, and it includes both volatile and non-volatile media, removable and non-removable media.

System memory 310 can include computer system readable media in the form of volatile memory, such as random access memory (RAM) and/or cache memory. The network controller 110 may further include other removable/non-removable, volatile/non-volatile computer system storage media. In some examples, storage system 320 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, nonvolatile optical disk such as a CD-ROM, DVD-ROM or other optical media can be provided. In such instances, each can be connected to bus 350 by one or more data media interfaces. As further depicted and described below, system memory 310 includes include at least one program product having a set (e.g., at least one) of program modules 315 that are configured to carry out the functions of embodiments of the network controller 110 and the ED-RRM module 150 described herein. The network controller 110 may further include other removable/non-removable volatile/non-volatile computer system storage media. In some examples, storage system 320 may be included as part of system memory 310 and may typically provide a non-volatile memory for the networked computing devices, and may include one or more different storage elements such as Flash memory, a hard disk drive, a solid state drive, an optical storage device, and/or a magnetic storage device. Storage system 320 may include media for storing data related to interfering signal 201, signal inputs 202, machine learning outputs 321, module outputs 322 (including the device type output 206, the predicted duration 216, and the ED-RRM decision 221), and other information 323 used by the network controller 110. The information stored in storage system 320 may be updated and accessed by the program modules 315 described herein.

System memory 310 may also include a plurality of program modules 315 for performing various functions related the function of the network controller 110 such as system module 311 as well the modules of the ED-RRM module 150. The program modules 315 generally include program code that is executable by one or more of the processors 305.

Figure 4:
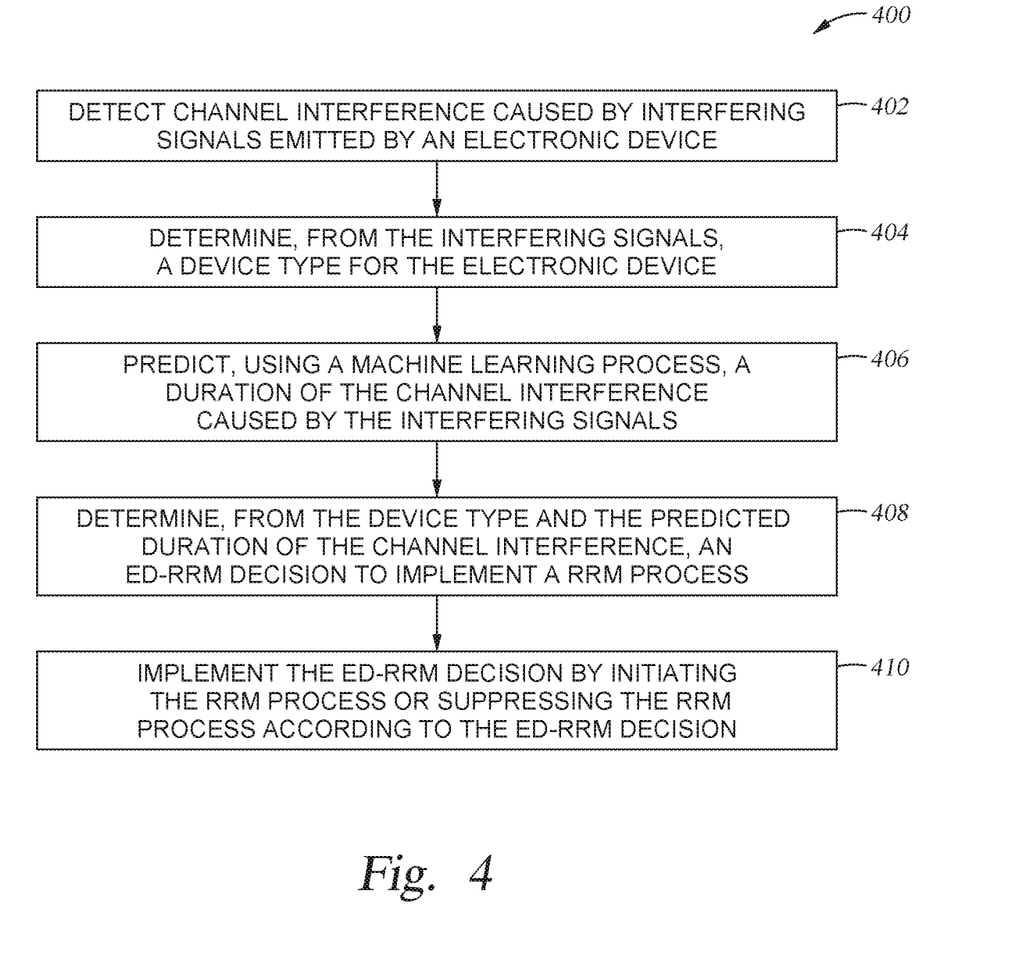
FIG. 4 is a flow chart outlining general operations for ED-RRM, according to embodiments described herein.

FIG. 4 is a flow chart outlining general operations for ED-RRM, according to embodiments described herein. Method 400 begins at block 402, where the system module 311, detects channel interference caused by interfering signals emitted by an electronic device. For example, the system module 311 receives an indication of interference from one or more APs in the network system 100. For example, when the microwave 120 emits interfering signal 120a, at least APs 103a, 103c, 103d, and 103f detect the interfering signal 120a and report the detection to the network controller 140. In some examples, the APs report detected properties of the interfering signal including any information related to the current duration and strength of the signal at the AP. For example, for the interfering signal 122a, the AP 103b may report a detection of the interfering signal along with a current strength of the signal and a past strength of the signal. Likewise, the AP 103a reports the detection of the interfering signal 122a along with a current strength and past strength of the signal.

At block 404, the device type classifier module 205 determines, from the interfering signals, a device type for the electronic device. In some examples, the device type classifier module 205 performs a deterministic method to classify the device type for the electronic device. For example, for the interfering signal 124a from the laptop 124, the interfering signal may include information (e.g., the MAC address, traffic type, etc.) that is used by the device type classifier module 205 to fingerprint the type of device, such as a laptop computer. In another example, the interfering signal 124a may not include any information (e.g., digital data) that can be parsed and/or used by the device type classifier module 205 to classify the laptop 124. In this example, the device type classifier module 205 uses the machine learning function (e.g., the neural network) to classify the type of device. For example, the trained neural network identifies a typical interfering signal 124a as emitting from a device that exhibits the behavior of a laptop, such as the laptop 124.

In another example, the interfering signal, is not a communication signal and thus cannot be parsed in any manner for device type classification. For example, the interfering signal 120a emitted by the microwave 120 is used by the device type classifier module 205 to generally classify the microwave 120 based on its expected behavior (e.g., large amounts of temporary directional interference).

At block 406, the duration predictor module 210 predicts, using a machine learning process, an interference parameter such as a duration of the channel interference. For example, the duration predictor module 210 uses the neural network to process the signal parameters 211 and predict the duration of the channel interference. In some examples, the signal parameters 211 include one or more of the determined device type from block 404, a signal strength at a first access point (AP) in the network, such as the primary AP experiencing the highest level of interference in the network system 100, and a signal strength at one or more other APs, including any secondary APs experiencing interference at a lower level than the primary or first AP. In some examples, the signal strength at the first AP and the one or more other APs can be used to determine whether the interference is transitory, such as the device 122 moving in the direction 180. In another example, the signal strengths are used to determine the position of the electronic device in order to determine actions for individual APs and/or whether the electronic device is stationary.

The parameters also include a signal detection history for the interfering signals, including a signal detection history at the primary AP as well as secondary APs. The signal detection history is used to determine whether the interfering electronic device is moving through the network system 100. In some examples, the signal detection history is used to predict a current duration of the interference based on past similar interferences.

In another example, the parameters include a source type for the electronic device. For example, the APs and/or system module 311 may identify some electronic devices as a particular source type, such as Wi-Fi sources (e.g., Wi-Fi AP 121, a hotspot from laptop 124 or device 122, etc.) or long term evolution in unlicensed spectrum (LAA). In some examples, the source type indicates that the duration is expected to be long, but that the electronic device is expected to cooperate with the APs and the network controller 140 to avoid traffic interference between the devices.

The parameters also include a source media access control address and a signal bandwidth for the interfering signals when the electronic device provides the information in the interfering signal. In one example, the Wi-Fi AP 121 broadcasts an independent Wi-Fi signal, interfering signal 121a, but functions as a rogue Wi-Fi source and does not interact with the APs of the network system 100. In this example, the MAC address and the bandwidth of the Wi-Fi AP 121 are used to predict that, despite the source type expectation that the Wi-Fi AP 121 cooperate with neighboring APs, the duration of the interference is a long time period since the Wi-Fi AP 121 is not actually cooperating with the network system 100 to reduce interference.

In some examples, the duration predictor module 210 determines a confidence or variance level for the predicted duration based training level of the machine learning process for the electronic device. For example, if the device type/source type and/or other parameters are untrained or have not been experienced in the network system 100 before, the confidence level is low; indicating that the actual duration of the interference may vary from the predicted duration. In contrast, when the confidence level is high, the predicted duration is expected to match the actual duration of the interference. In some examples, the confidence level and the signal parameters 211 are passed from the duration predictor module 210 to the ED-RRM decision module 220 along with the duration prediction 216.

While described herein in relation to determined duration of channel interference. The machine learning process(es) may also be used to determine one or more other interference parameters such as predicted signal strength in the near future to determine a ED-RRM decision.

At block 408, the duration predictor module 210 determines, using the machine learning process and from the device type and the predicted duration of the channel interference, an ED-RRM decision to implement an RRM process, such as changing a channel for one or more APs in the network system 100. For example, when the device type and the predicted duration indicate that the interference is temporary, the ED-RRM decision is to suppress/block the RRM process for the APs. In another example, when the device type and predicted duration indicate that the interference is prolonged, the ED-RRM decision is to initiate the RRM processes for one or more APs in the network system so that that the APs can operate in a less congested radio frequency channel.

In another example, the module uses the determined confidence level to determine the ED-RRM decision. For example, when device 122 is identified as transitory and the predicted duration of interference is low, such that the AP 103a would not initiate an RRM process, if the confidence level is low and the signal interference is high, the ED-RRM decision includes a decision to initiate the RRM process to avoid potential network connection problems that may be caused by the electronic device. Once the neural network has been trained and/or the behavior of the device 122 can be predicted more accurately, the confidence level determined by the device type classifier module 205 increases. In this example, the duration predictor module 210 determines that the AP 103a should not initiate the RRM process and thus wait for the interference to cease.

At block 410, the system module 311 implements the ED-RRM decision by initiating the RRM process or suppressing/blocking the RRM process according to the ED-RRM decision. In some examples, implementing the ED-RRM process includes signaling to the one or more APs whether to initiate the RRM process to change channels or suppress the RRM process and wait for the interference to pass.

Figure 5:
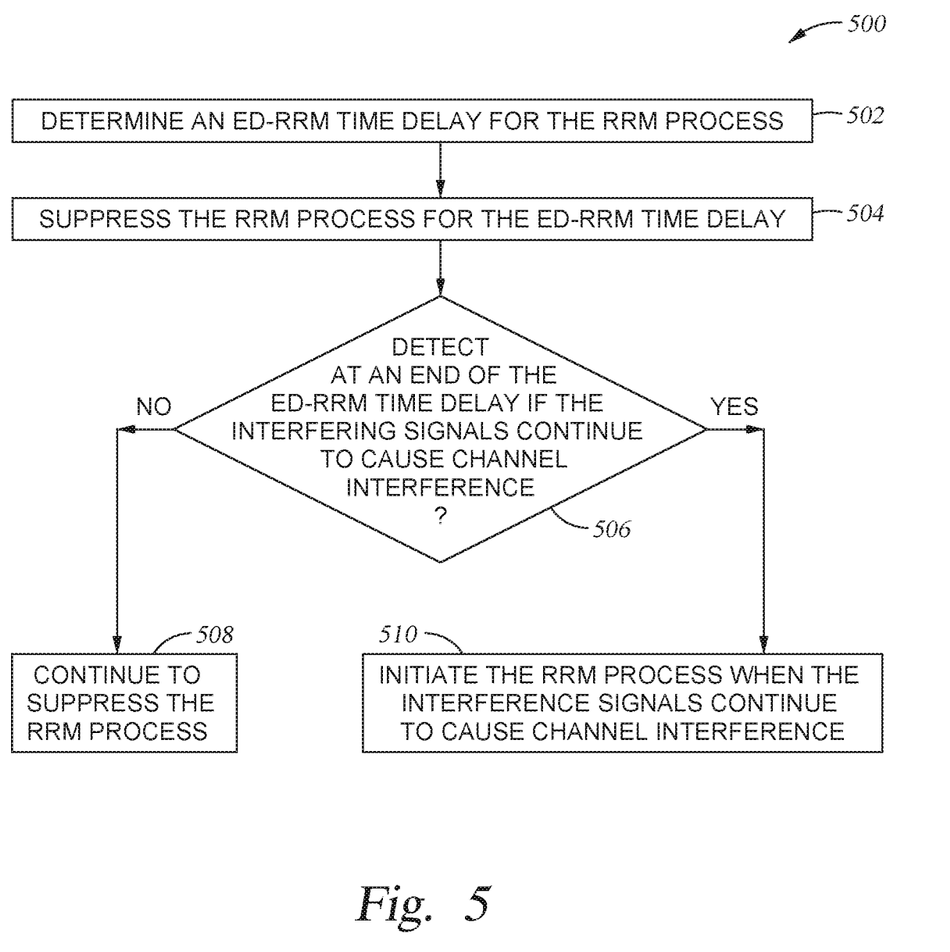
FIG. 5 is a flow chart outlining general operations for predicting a duration of interference, according to embodiments described herein

FIG. 5 is a flow chart outlining general operations for predicting a duration of interference, according to embodiments described herein. Method 500 begins at block 502, where the duration predictor module 210, determines an ED-RRM time delay for the RRM process. In some examples, the ED-RRM time delay is based on a confidence level for the duration prediction. For example, if the confidence level is a medium confidence level and the predicted duration is short, the duration predictor module 210 determines the ED-RRM time delay before the RRM process begins to allow time for the interference to pass.

Implementation of the ED-RRM decision proceeds at block 504, where the system module 311 suppresses the RRM process during the ED-RRM time delay and at block 506 detects, at an end of the ED-RRM time delay, if the interfering signals are continuing to cause channel interference. For example, the system module 311, at the end of the time delay interrogates the APs to determine if the interference is ongoing. If the interference has ended, method 500 continues to block 508, where the system module 311 continues to suppress the RRM process. When the interference is detected to be ongoing, the method continues to block 510 where the system module 311 initiates the RRM for the APs.

Figure 6:
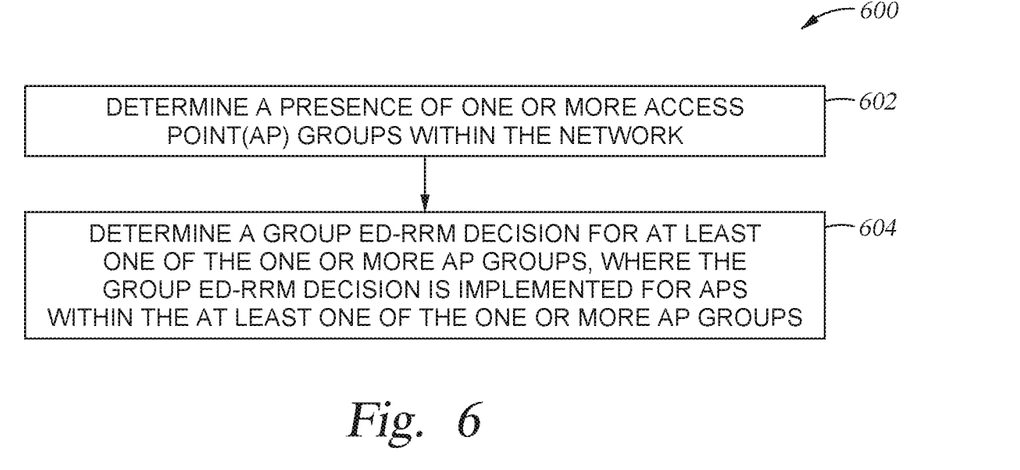
FIG. 6 is a flow chart outlining general operations for access point group ED-RRM, according to embodiments described herein.

FIG. 6 is a flow chart outlining general operations for access point group ED-RRM, according to embodiments described herein. Method 600 begins at block 602, where the system module 311 determines a presence of one or more access point (AP) groups within the network. For example, within the network system 100, there are APs that experience similar environmental conditions. The AP group 130 includes a group of APs that are in the same room, geographic area, or otherwise experience similar conditions. In some examples, the AP group is manually defined by a network administrator. In another example, the system module 311 groups the APs based on information received from the APs including the interfering signals.

At block 604, the duration predictor module 210 determines a group ED-RRM decision for at least one of the one or more AP groups, where the group ED-RRM decision is implemented for APs within the at least one of the one or more AP groups. For example, if the ED-RRM decision is to initiate the RRM process to change the operating channel of the AP 103b, the ED-RRM decision is also applied as the group ED-RRM decision for APs 103c and 103d, even if the other APs in the AP group 130 are not experiencing interference.

Figure 7:
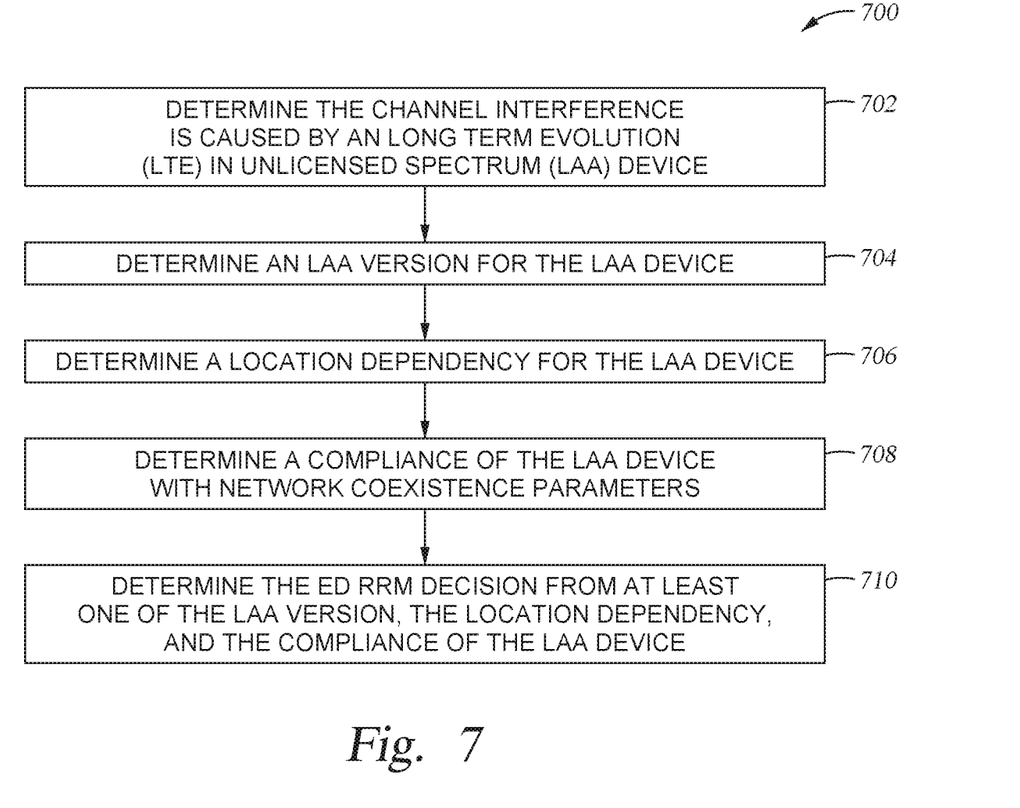
FIG. 7 is a flow chart outlining general operations for long term evolution in unlicensed spectrum (LAA) ED-RRM, according to embodiments described herein.

FIG. 7 is a flow chart outlining general operations for LAA ED-RRM, according to embodiments described herein. As described above, in most cases, prolonged interference in the network system 100 causes the APs in the network system 100 to initiate an RRM process to switch channels in search of better medium availability. In the case of a detected LAA interference source, the optimal system response is for an AP to stay on the channel in the interest of preserving a Wi-Fi presence in the channel. Method 700 begins at block 702, where the duration predictor module 210, determines that channel interference is caused by a LAA device. In some examples, the duration predictor module 210 uses the device type output 206, the predicted duration prediction 216, and the source type 211c to determine that the interference is caused by an LAA device (e.g., device 122).

At blocks 704, 706, and 708, the duration predictor module 210 determines an LAA version for the LAA device, a location dependency for the LAA device, and a compliance of the LAA device with network coexistence parameters. In some examples, the determined LAA version is used to determine if the LAA device is capable of uploading connections, downloading connections, and/or both uploading and downloading connections. In some examples, when the LAA device is capable of more features (e.g., upload and download), the ED-RRM decision attempts to avoid congestion with the LAA device by initiate the RRM process to switch channels.

The compliance of the LAA device with the network coexistence parameters is also used to determine if the AP should switch channels. For example, if the LAA device is not compliant with the coexistence parameters, the AP may cede the channel frequencies to the LAA device. Additionally, the location dependency of the LAA device is used to determine if the LAA device has access to cellular networks other than the network system 100. For example, if the cellular signal is too low in some areas, the network system 100 may switch channels to allow the LAA devices to utilize the interfering frequencies.

At block 710, the duration predictor module 210, determines the ED RRM decision using at least one of the LAA version, the location dependency, and the compliance of the LAA device. In some examples, the ED-RRM decision includes a reassignment of a primary channel of the network to a secondary channel of the network, where the AP does not switch channels completely. The reassignment preserves a level of Wi-Fi connection in the area around the LAA device, but switches most traffic to a different channel frequency to reduce the effects of the interference instance.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

The flowchart and block diagrams in the FIGS. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method for event-driven radio resource management (ED-RRM) at a central controller in a network comprising:
  detecting channel interference caused by interfering signals emitted by an electronic device;
  determining from the interfering signals a device type for the electronic device;

predicting, using a machine learning process, an interference parameter based on at least the device type and a transitory status of the electronic device; and
determining, based on the device type and the predicted interference parameter, an ED-RRM decision to implement an RRM process; and
implementing the ED-RRM decision by at least one of initiating the RRM process and suppressing the RRM process according to the ED-RRM decision.

2. The method of claim 1, wherein predicting the interference parameter comprises predicting a duration of the channel interference based on one or more of:
the determined device type;
a signal strength at a first access point (AP) in the network;
a signal strength at one or more other APs; and
a signal detection history for the interfering signals.

3. The method of claim 2, wherein predicting the duration of the channel interference further comprises:
determining a confidence level for the predicted duration based training level of the machine learning process for the electronic device; and
wherein determining the ED-RRM decision further comprises using the determined confidence level to determine the ED-RRM decision.

4. The method of claim 3, wherein determining the ED-RRM decision further comprises:
determining an ED-RRM time delay for the RRM process based on at least one of the confidence level and the predicted duration; and
wherein implementing the ED-RRM decision further comprises:
suppressing the RRM process for the ED-RRM time delay;
detecting at an end of the ED-RRM time delay if the interfering signals are continuing to cause channel interference; and
initiating the RRM process when the interfering signals continue to cause channel interference.

5. The method of claim 1, further comprising:
determining a presence of one or more access point (AP) groups within the network; and
wherein determining the ED-RRM decision further comprises:
determining a group ED-RRM decision for at least one of the one or more AP groups, wherein the group ED-RRM decision is implemented for APs within the at least one of the one or more AP groups.

6. The method of claim 1, further comprising:
determining the channel interference is caused by an Long Term Evolution (LTE) in unlicensed spectrum (LAA) device;
determining an LAA version for the LAA device;
determining a location dependency for the LAA device; and
determining a compliance of the LAA device with network coexistence parameters; and
wherein, determining the ED-RRM decision further comprises:
determining the ED RRM decision from at least one of the LAA version, the location dependency, and the compliance of the LAA device.

7. The method of claim 6, wherein the ED-RRM decision comprises a reassignment of a primary channel of the network to a secondary channel of the network.

8. The method of claim 1, wherein the predicting the interference parameter comprises predicting a future interference signal strength based on one or more of:
the determined device type;
a signal strength at a first access point (AP) in the network;
a signal strength at one or more other APs; and
a signal detection history for the interfering signals.

9. A system for event-driven radio resource management (ED-RRM) at a central controller in a network, comprising:
a processor; and
a memory comprising instructions which, when executed on the processor, performs an operation, the operation comprising:
detecting channel interference caused by interfering signals emitted by an electronic device;
determining from the interfering signals a device type for the electronic device;
predicting, using a machine learning process, an interference parameter based on at least the device type and a transitory status of the electronic device; and
determining, based on the device type and the predicted interference parameter, an ED-RRM decision to implement an RRM process; and
implementing the ED-RRM decision by at least one of initiating the RRM process and suppressing the RRM process according to the ED-RRM decision.

10. The system of claim 9, wherein predicting the interference parameter comprises predicting a duration of the channel interference based on one or more of:
the determined device type;
a signal strength at a first access point (AP) in the network;
a signal strength at one or more other APs; and
a signal detection history for the interfering signals.

11. The system of claim 10, wherein predicting the duration of the channel interference further comprises:
determining a confidence level for the predicted duration based training level of the machine learning process for the electronic device; and
wherein determining the ED-RRM decision further comprises using the determined confidence level to determine the ED-RRM decision.

12. The system of claim 11, wherein determining the ED-RRM decision further comprises:
determining an ED-RRM time delay for the RRM process based on at least one of the confidence level and the predicted duration; and
wherein implementing the ED-RRM decision further comprises:
suppressing the RRM process for the ED-RRM time delay;
detecting at an end of the ED-RRM time delay if the interfering signals are continuing to cause channel interference; and
initiating the RRM process when the interfering signals continue to cause channel interference.

13. The system of claim 9, wherein the operation further comprises:
determining a presence of one or more access point (AP) groups within the network; and
wherein determining the ED-RRM decision further comprises:
determining a group ED-RRM decision for at least one of the one or more AP groups, wherein the group ED-RRM decision is implemented for APs within the at least one of the one or more AP groups.

14. The system of claim 9, wherein the operation further comprises:
  determining the channel interference is caused by an Long Term Evolution (LTE) in unlicensed spectrum (LAA) device;
  determining an LAA version for the LAA device;
  determining a location dependency for the LAA device; and
  determining a compliance of the LAA device with network coexistence parameters; and
  wherein, determining the ED-RRM decision further comprises:
    determining the ED RRM decision from at least one of the LAA version, the location dependency, and the compliance of the LAA device.

15. A computer program product for system for event-driven radio resource management (ED-RRM) at a central controller in a network, the computer program product comprising a non-transitory computer-readable medium program having program instructions embodied therewith, the program instructions executable by a processor to perform an operation comprising:
  detecting channel interference caused by interfering signals emitted by an electronic device;
  determining from the interfering signals a device type for the electronic device;
  predicting, using a machine learning process, an interference parameter based on at least the device type and a transitory status of the electronic device; and
  determining, based on the device type and the predicted interference parameter, an ED-RRM decision to implement an RRM process; and
  implementing the ED-RRM decision by at least one of initiating the RRM process and suppressing the RRM process according to the ED-RRM decision.

16. The computer program product of claim 15, wherein predicting the interference parameter comprises predicting a duration of the channel interference based on one or more of:
  the determined device type;
  a signal strength at a first access point (AP) in the network;
  a signal strength at one or more other APs; and
  a signal detection history for the interfering signals.

17. The computer program product of claim 16, wherein predicting the duration of the channel interference further comprises:
  determining a confidence level for the predicted duration based training level of the machine learning process for the electronic device; and
  wherein determining the ED-RRM decision further comprises using the determined confidence level to determine the ED-RRM decision.

18. The computer program product of claim 17, wherein determining the ED-RRM decision further comprises:
  determining an ED-RRM time delay for the RRM process based on at least one of the confidence level and the predicted duration; and
  wherein implementing the ED-RRM decision further comprises:
    suppressing the RRM process for the ED-RRM time delay;
    detecting at an end of the ED-RRM time delay if the interfering signals are continuing to cause channel interference; and
    initiating the RRM process when the interfering signals continue to cause channel interference.

19. The computer program product of claim 15, wherein the operation further comprises:
  determining a presence of one or more access point (AP) groups within the network; and
  wherein determining the ED-RRM decision further comprises:
    determining a group ED-RRM decision for at least one of the one or more AP groups, wherein the group ED-RRM decision is implemented for APs within the at least one of the one or more AP groups.

20. The computer program product of claim 15, wherein the operation further comprises:
  determining the channel interference is caused by an Long Term Evolution (LTE) in unlicensed spectrum (LAA) device;
  determining an LAA version for the LAA device;
  determining a location dependency for the LAA device; and
  determining a compliance of the LAA device with network coexistence parameters; and
  wherein, determining the ED-RRM decision further comprises:
    determining the ED RRM decision from at least one of the LAA version, the location dependency, and the compliance of the LAA device.

* * * * *